J. J. CAREY.
AUTOMATIC VALVE FOR GAS COCKS AND THE LIKE.
APPLICATION FILED FEB. 17, 1920.
1,375,362. Patented Apr. 19, 1921.
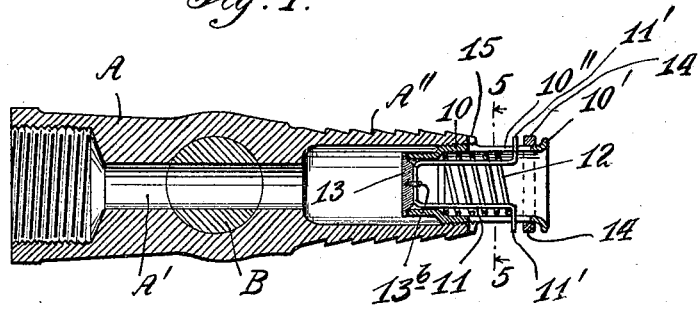
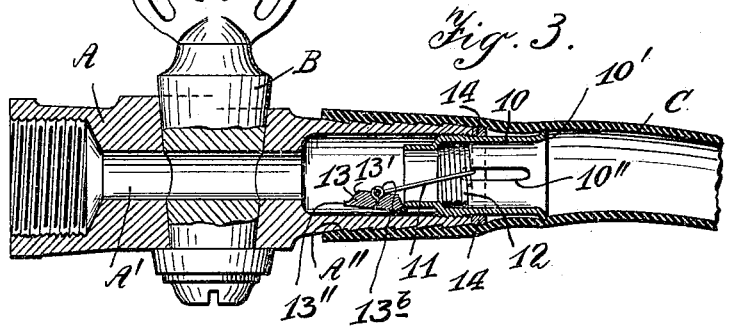
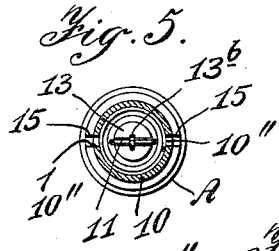
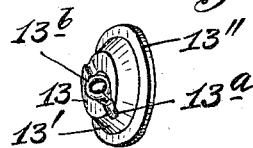
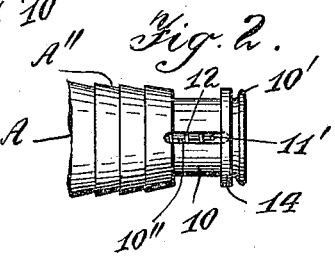
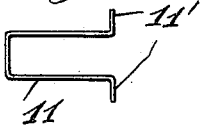
WITNESS:
INVENTOR.
John J. Carey.
BY
ATTORNEY.

UNITED STATES PATENT OFFICE.

JOHN J. CAREY, OF BROOKLYN, NEW YORK.

AUTOMATIC VALVE FOR GAS-COCKS AND THE LIKE.

1,375,362.  Specification of Letters Patent.  Patented Apr. 19, 1921.

Application filed February 17, 1920. Serial No. 359,405.

*To all whom it may concern:*

Be it known that I, JOHN J. CAREY, a citizen of the United States, and a resident of the borough of Brooklyn, in the county of Kings, city and State of New York, have invented certain new and useful Improvements in Automatic Valves for Gas-Cocks and the like, of which the following is a specification.

In the operation of gas-stoves and the like, it is customary to connect an ordinary gas-cock with the stove or other appliance by means of flexible tubing or gas-hose. With this manner of making the connection, there is danger of serious and even fatal accidents if the tubing or hose should through negligence, ignorance, or chance become separated from the gas-cock while the latter is open, since if the tubing comes off the gas-cock under such conditions, the gas will escape and expose the occupants of the building to the risks of asphyxiation and of fire. In order to avoid these dangers, I have devised a novel construction including a valve which will be opened automatically when the end of the gas-hose is applied to the gas-cock, and which will close automatically when said end is disconnected either intentionally or accidentally.

Without desiring to limit myself to the details shown herein, I have illustrated a satisfactory and preferred form of my invention in the accompanying drawings, in which Figure 1 is a horizontal axial section of a gas-cock provided with my improvement; Fig. 2 is a side elevation of the free end of said cock, both Figs. 1 and 2 illustrating the valve in the closed position which it takes automatically when the gas-hose is taken off; Fig. 3 is a longitudinal vertical section of the cock with the gas-hose applied and the valve open; Fig. 4 is a detail view of one part of the improvement; Fig. 5 is a cross section on the line 5—5 of Fig. 1; and Fig. 6 is a detail perspective view, showing the valve proper, on an enlarged scale.

A indicates the casing of a gas-cock of any usual or approved construction, except as modified to conform to the parts of my invention, specified hereinafter. This casing has the usual gas-passage A', controlled by the plug B, and its outer surface has the customary annular ridges A'' to afford a better hold for the gas-tube or hose C.

At the end adapted to receive said hose or tube, I provide my improved valve arrangement or attachment, which, in the construction shown, comprises the following five parts: First, a sleeve 10 secured to the casing A rigidly and extending within the passage A'; second, a valve-carrier 11 movable lengthwise of said sleeve; third, a spring 12 tending to move said carrier outwardly; fourth, a valve 13 connected with said carrier and adapted to become seated on the inner end of the sleeve; and fifth, a ring or collar movable on the outside of said sleeve and engaging the valve-carrier to move it inwardly when the collar is pushed in a like direction in the act of applying the end of the gas-tube to the gas-cock.

In detail, the construction is as follows: The sleeve 10 is made of two portions of different diameters, the wide outer portion engaging the casing A on the inside of the passage A', and being secured thereto rigidly in any approved manner; for instance, the sleeve may be screwed into the outer end of the passage A', which would be threaded for this purpose, and to prevent accidental unscrewing of the sleeve, it might be then soldered to the end of the casing A; or the sleeve might be simply slipped or slid into the end of the passage A', and then soldered fast to the casing A. This wide portion of the sleeve projects in part from the casing A, and the outer end of the sleeve is made with an external stop shoulder 10' formed in any suitable manner. Said wide portion of the sleeve is also made with two diametrically-opposite longitudinal slots 10''. The reduced inner portion of the sleeve 10 is spaced from the inner wall of the passage A'.

The valve-carrier 11 is substantially U-shaped, with its longitudinal members lying adjacent to the inner wall of the reduced inner portion of the sleeve, so as to be guided thereby during the longitudinal movement of the valve-carrier. The transverse member of the valve-carrier 11 is located at the inner end thereof. At its outer end, the valve-carrier has alining pin-like portions 11' bent outwardly to extend through and beyond the slots 10''.

The spring 12 is coiled within the wide portion of the sleeve 10, and surrounds the valve-carrier 11, the longitudinal members of which may also be guided by said spring. The inner end of the spring 12 bears against the internal shoulder formed at the junction of the two portions of the sleeve 10; the outer end of the coiled spring engages the ends 11' of the valve-carrier 11, thus tending to press said carrier outwardly.

The ring or collar 14 is mounted to slide lengthwise on the wide outer portion of the sleeve 10, between the shoulder 10' and a point determined by the innermost position of the valve-carrier 11. The collar 14 lies between the ends 11' of the valve-carrier and the stop 10'. The thickness of the collar 14, the length and position of the slots 10", the length of the carrier 11, and the position of the stop 10' are so proportioned that when the carrier 11 is in its outermost position (Fig. 1), which corresponds to the seated or closed position of the valve 13, as will be set forth presently, the collar 14 will have a slight longitudinal play between the ends 11' of the valve-carrier 11 and the stop 10', and the ends 11' of said carrier will be out of contact with the ends of the slots 10", thus insuring a free outward movement of the carrier ends 11' until the valve 13 is properly seated.

The valve 13 is a disk-like body having a conical portion 13' adapted to become seated on the inner edge of the sleeve 10, and preferably an annular flange 13" at the outer edge. At the narrow end of the cone portion 13', the valve has a diametrical groove 13ª adapted to receive the transverse member at the inner end of the valve-carrier 11, said member also extending through an eye 13ᵇ secured rigidly to the valve at this end. The valve 13 may slide lengthwise on the transverse member of the carrier 11, and may also turn on the same as on a hinge.

I prefer to make the free end of the casing A with two recesses 15 at diametrically opposite points, said recesses being of sufficient depth to receive the carrier portions 11' when in their innermost position (Fig. 3), and it will be understood that the sleeve 10 will be secured to the casing A in such a position as to bring the slots 10" in registry with said recesses 15, as shown most clearly in Fig. 2.

The operation of my improved device will be understood readily. Before the tube C is attached, or whenever such tube is removed from the gas-cock, the spring 12 will force the carrier 11 outward until the valve 13 is seated and closed tight, as shown in Fig. 1. It will be understood that nothing but the seating of said valve stops the outward movement of the valve-carrier 11, Fig. 1 showing clearly that neither the outer ends of the slots 10" nor the collar 14 arrest the outward movement of the carrier 11.

When the gas-hose C is applied to the cock, the end of the hose, as it is slipped over the projecting portion of the tube or sleeve 10 and over the adjacent end of the casing A, will engage the collar 14 (the diameter of which is preferably the same as that of the casing so that the outer surfaces of both will be flush with each other), and the hose will thus push said collar 14 back, thereby pressing the valve-carrier 11 inward through the action of said collar on the ends 11' of the valve-carrier. The inward movement of the carrier 11 will not only unseat the valve 13 so that gas can pass from the cock to the hose C and to the stove or other appliance at the other end of said hose, but the valve 13 will be caused to turn or swing downward on the transverse member of the carrier, so as to take a position out of the direct path of the gas. As indicated in Fig. 3, not only the valve 13, but the carrier 11 as well swings downwardly, the ends 11' acting as a horizontal pivot for this movement of the carrier. The valve 13 will thus be brought largely or entirely to one side of the opening at the inner end of the sleeve or tube 10, thereby making practically the entire cross section of the tube or sleeve, at said opening, available for the passage of the gas, the fact that the inner end of the tube 10 is spaced from the wall of the passage A' affording ample room for such movement of the valve while preserving a good-sized passage in the body A at the point occupied by the valve when swung aside. The advantage of reducing the inner end of the tube 10 and of spacing said end from the inner surface of the passage A' will now be understood readily. It will also be obvious that in order to obtain all the advantages of my invention, the transverse member of the valve-carrier 11 should be horizontal or nearly so, thus enabling the valve 13 to swing downward on said member when the carrier is pushed in. The two slots 10" and the two recesses 15 are therefore preferably arranged at the same level on the sleeve or tube 10 and on the casing of body A respectively. As the parts reach the position shown in Fig. 3, the ends 11' of the carrier 11 become seated in the recesses 15, it being understood that the slots 10" are long enough to allow such movement. Generally, in applying the hose C to the cock, a person will not simply push or slide the hose on the end of the cock casing or body, but will at the same time twist or turn the hose C. Inasmuch as this hose engages the ends 11' of the valve carrier 11, a strain is set up tending to turn said carrier and the tube 10 through which the carrier ends 11' extend, whereby the tube 10 might be loosened if I had not provided the expedient described, by which the casing or body A itself, at the recesses 15, is made to resist the strain tending to turn the carrier and tube, so that the tendency of the hose C to turn the tube 10 will be avoided.

As long as the hose C remains connected with the cock, the supply of gas may be regulated and turned on or off by means of the plug B. Should the hose C come off accidentally, or be removed from the cock intentionally, my invention will insure an automatic shutting of the valve 13, thus stopping the flow of gas if the plug B should be in the open position at that time. All danger of asphyxiation, fire, and other accidents caused by gas escaping from the open cock after the hose C has been separated therefrom, is avoided with certainty. As soon as the hose C comes off the cock, the collar 14 and valve-carrier 11 move outwardly, partly owing to the pull of the hose, but chiefly on account of the pressure of the spring 12. As the carrier moves outward, the flange 13'' and the cone portion 13' of the valve 13 will come in contact with the inner end of the tube 10, and the pull of the carrier 11 will cause the valve to swing upward to its original transverse position and to become seated on the inner end of the tube 10, thus closing the passage A', as shown in Fig. 1. It will also be observed that the valve 13 opens inward, against the flow of the gas, so that the pressure of the gas will assist the action of the spring 12 in keeping the valve closed. In fact, should the pressure of the fluid be considerable, the spring 12 might be omitted, the closing of the valve being brought about by the pressure of the fluid and by the pull of the hose C as it comes off the cock.

While my invention has been designed particularly for use in connection with gas-cocks, it will be evident that it might be employed in connection with devices for delivering other fluids, whether gaseous or liquid, and especially such as would be liable to cause injury if allowed to escape. The plug B might be omitted in some cases, if regulation of the flow is not required, or is effected by other means, the supply of fluid to the hose C being in that case started or stopped simply by connecting or disconnecting the hose with the casing or body A.

Various modifications may be made without departing from the nature of my invention as set forth in the appended claims. While the sleeve or tube 10 has been described and shown as a part separate from the body or casing A, although rigidly secured thereto, it will be understood that this construction has been adopted chiefly for the sake of easier manufacture and convenient application to existing cocks, but I should consider it as lying within the scope of my invention to make said sleeve or tube integral with the body or casing A.

I claim as my invention:

1. In a device for controlling the flow of fluids, a casing having a passage for the fluid, a tube secured to said casing within said passage and projecting therefrom at one end, a valve carrier movable lengthwise of said tube, a valve connected with said carrier and adapted to close the passage through the tube, a spring tending to move the carrier so as to seat the valve, and a member movable longitudinally on the outside of the exposed portion of the tube so as to be engaged by a hose applied on the tube, said member being adapted to move the valve carrier to the valve-opening position.

2. In a device for controlling the flow of fluids, a casing having a passage for the fluid, a tube secured to said casing within said passage and projecting therefrom at one end, a valve carrier movable within said tube lengthwise thereof, and having portions projecting to the outside of the tube at the exposed portion thereof, a member slidable lengthwise of the projecting portion of the tube and adapted to move the carrier inward when a hose is applied to the tube, a spring for moving the carrier outward, and a valve connected with the inner portion of the carrier loosely and adapted to close the passage through the tube when the carrier is in its outer position.

3. In a device for controlling the flow of fluids, a casing having a passage for the fluid, a tube having a relatively wide outer portion projecting from the casing and having longitudinal slots, and a relatively narrow inner portion, a valve coöperating with said inner tube portion, a valve carrier connected with said valve loosely and extending lengthwise within the tube, and having its ends projecting outwardly through said slots and mounted to slide therein, a spring coiled in the wide portion of the tube and pressing outwardly against the ends of the valve carrier, and a member movable lengthwise on the outside of the projecting portion of the tube so as to be engaged by a hose applied on the tube, said member being adapted to move the valve carrier to the valve-opening position.

4. In a device for controlling the flow of fluids, a tube, a valve controlling the passage through said tube, a carrier connected with said valve and movable lengthwise of said tube, an operating member movable lengthwise on the outside of the tube so as to be engaged by a hose applied on the tube, said operating member being adapted to move the carrier to the valve-opening position, and means tending to close the valve.

5. In a device for controlling the flow of fluids, a tube, a valve controlling the passage through said tube, a carrier for said valve, movable lengthwise of the tube, and an operating member for said carrier, slidable lengthwise on the outside of said tube, so as to be engaged by a hose applied on the tube.

6. In a device for controlling the flow of fluids, a tube, a valve controlling the passage through said tube, a carrier to which said valve is swiveled, movable lengthwise of the tube, a spring for moving said carrier into the valve-closing position, and an operating member for moving the carrier to the valve-opening position, said member being slidable on the outer surface of the tube so as to be engaged and actuated by a hose applied on the tube.

7. In a device for controlling the flow of fluids, a tube, a valve controlling the passage through the tube, a carrier for said valve, extending lengthwise within the tube and movable to either a valve-opening or a valve-closing position, and an operating member for said carrier, movable on the outside of the tube and adapted to be engaged and actuated by a hose applied on the tube.

8. In a device for controlling the flow of fluids, a tube having longitudinal guides at the same level, a valve controlling the passage through the tube, a carrier for said valve, movable lengthwise of the tube and having portions guided pivotally along said guides to allow the carrier with the valve to swing downward when the valve is open, thereby removing the valve from the direct path of the fluid, and means for operating said carrier.

9. In a device for controlling the flow of fluids, a casing having a passage for the fluid, a tube secured to said casing within said passage and projecting therefrom at one end, the other end of the tube being spaced from the wall of said passage, a valve which in the closed position is seated on the inner end of the tube, and in its open position lies laterally of the tube so as to clear the fluid-passage, a carrier connected with said valve loosely, and means for operating the carrier.

10. In a device for controlling the flow of fluids, a casing having a passage for the fluid and provided at one end with recesses located at the same level, a tube secured to said casing and projecting therefrom, and provided in its projecting portion with slots located at the same level and registering with said recesses, a U-shaped carrier the side members of which extend lengthwise within said tube and the ends of which are movable in said slots and recesses, a valve connected with the transverse member of said carrier, a spring tending to move the carrier into the valve-closing position, and an actuating member mounted to slide on the outside of the projecting tube portion and adapted to be engaged and moved by a hose applied on the tube, to move the carrier against the action of said spring.

In testimony whereof I have signed this specification.

JOHN J. CAREY.